United States Patent
Shinkai et al.

[11] Patent Number: 5,683,855
[45] Date of Patent: Nov. 4, 1997

[54] PRINTABLE MEMBERS

[75] Inventors: Masahiro Shinkai, Chiba; Kenryo Namba, Tokyo, both of Japan

[73] Assignee: TDK Corporation, Tokyo, Japan

[21] Appl. No.: 613,985

[22] Filed: Mar. 8, 1996

[30] Foreign Application Priority Data

Mar. 9, 1995 [JP] Japan ................. 7-078096

[51] Int. Cl.$^6$ ................................. G11B 7/24
[52] U.S. Cl. ............ 430/270.11; 430/945; 347/105
[58] Field of Search ................. 430/270.11, 945; 347/105

[56] References Cited

U.S. PATENT DOCUMENTS

| | | | |
|---|---|---|---|
| 4,830,911 | 5/1989 | Kojima et al. | 347/105 |
| 5,439,739 | 8/1995 | Furukawa et al. | 347/105 |
| 5,470,691 | 11/1995 | Arai et al. | 430/945 |

FOREIGN PATENT DOCUMENTS

| | | |
|---|---|---|
| 61-228984 | 10/1986 | Japan . |
| 63-224988 | 9/1988 | Japan . |
| 1-188387 | 7/1989 | Japan . |
| 4-1706 | 1/1992 | Japan . |
| 6-78030 | 10/1994 | Japan . |
| 8-025797 | 1/1996 | Japan . |

*Primary Examiner*—John A. McPherson
*Attorney, Agent, or Firm*—Oblon, Spivak, McClelland, Maier & Neustadt, P.C.

[57] ABSTRACT

A printable member comprising a substrate and a surface layer thereon is provided. The surface layer is a radiation cured coating comprising a compound having a quaternary ammonium salt group having three alkyl groups and a compound having a carboxyl group. The three alkyl groups contain at least 4 carbon atoms in total. At least one compound is a monomer having an ethylenically unsaturated reactive group. The surface layer is printable with an ink containing a water soluble dye and improved in quick drying and water resistance.

12 Claims, 1 Drawing Sheet

PRINTABLE MEMBERS

BACKGROUND OF THE INVENTION

1. Field of the Invention

This invention relates to a printable member for use with an ink jet printing method.

2. Prior Art

Use of water soluble inks which may dispense with organic solvents as much as possible becomes widespread partially because of the increased concern about environmental pollution. The advanced ink jet printing method enables printing on a variety of substrates. The ink jet printing method generally uses an ink which is composed mainly of a water soluble dye such as acid and direct dyes and water as a solvent. In most cases, the ink further contains a minor amount of polyhydric alcohol.

Substrates or members which are printable by the ink jet printing method are substrates having a hydrophilic surface such as plain paper and special paper for ink jet printing having a porous ink receptive layer. Substrates are often formed with a printable layer on their surface. The printable layers are layers of water-soluble polymers such as starch, gelatin, casein, gum arabic, sodium alginate, carboxymethyl cellulose, polyvinyl alcohol, polyvinyl pyrrolidone, and sodium polyacrylic acid and layers of organic solvent-soluble resins such as synthetic resin latexes (e.g., synthetic rubber latex), polyvinyl butyral, and polyvinyl chloride. Use of cationic polymers was also proposed. Since many water soluble dyes for ink jet printing contain anions such as sulfonic acid, it is expected that the cationic polymers form ionic bonds therewith to prevent the ink from re-dissolving. Known cationic polymers include polyvinyl alcohol having a quaternary ammonium salt group, polyacrylates, and polyacrylamides as disclosed in Japanese Patent Application Kokai (JP-A) No. 228984/1986, for example. It is also proposed in Japanese Patent Publication (JP-B) No. 1706/1992 to use polyethylene glycol dicarboxylic acid for improving color.

These water soluble polymers are so hydrophilic that they are well compatible or affinitive with hydrophilic substrates such as paper. No problems arise with respect to adhesion when printable layers are formed on the substrate surface using the water soluble polymers. However, problems arise when printable layers of water soluble polymers are formed on substrates having a hydrophobic surface, for example, coatings of UV-cured resins often used as the protective film of optical recording media. The printable layer can be peeled off because of poor adhesion therebetween. Sometimes the printable layer itself is less resistant to water. After printing, printed ink can be substantially oozed with water droplets. Low hardness of the printable layer is also a problem.

SUMMARY OF THE INVENTION

An object of the present invention is to provide a printable member having on a substrate a printable surface layer which can be formed by a single coating step.

Another object of the present invention is to provide a printable member having a printable surface layer which is printable with an ink containing a water soluble dye with the advantage of quick drying.

A further object of the present invention is to provide a printable member having a printable surface layer which has improved adhesion, water resistance and print stability in the sense that when the printed surface layer is wiped after wetting, neither the printed mark is wiped off nor the layer itself is stripped.

A still further object of the present invention is to provide a printable member having a printable surface layer which has high surface hardness and color printability.

The present invention provides a printable member comprising a substrate and a surface layer thereon which is printable with an ink containing a water soluble dye, especially by an ink jet printing method. The surface layer is a radiation cured coating comprising a compound having a quaternary ammonium salt group having three alkyl groups and a compound having a carboxyl group. At least one of the compounds is a monomer having an ethylenically unsaturated reactive group at a terminal end. The total number of carbon atoms contained in the three alkyl groups of the quaternary ammonium salt group is at least 4.

Preferably, the compound having a quaternary ammonium salt group is a monomer of the following formula (1) or (2):

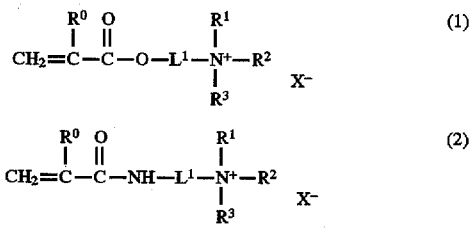

wherein $R^0$ is a hydrogen atom or methyl group, $R^1$, $R^2$, and $R^3$ each are an alkyl group, the total number of carbon atoms contained in these three alkyl groups being at least 4, $L^1$ is an alkylene group of 1 to 8 carbon atoms which may have at least one intervening group selected from an oxy group (—O—) and a carbonyl group (—CO—), and $X^-$ is a halide ion. More preferably, at least one of $R^1$, $R^2$ and $R^3$ is an alkyl group having 3 to 10 carbon atoms.

Preferably the compound having a carboxyl group is at least one member selected from the class consisting of acrylic acid, methacrylic acid and derivatives thereof.

In preferred embodiments, the coating further contains a compound having a hydroxyl group, a compound having a morpholino group, and/or porous particles. Typically, the coating is cured with ultraviolet radiation.

In one preferred embodiment, the substrate is an optical recording medium having a radiation-cured protective film, typically a UV-cured protective film. More particularly, the optical recording medium has a recording layer, a reflecting layer disposed closely on the recording layer, and at least one layer of protective film on the reflecting layer including the above-mentioned protective film. Preferably at least one layer of the surface layer and the protective film contains a white pigment.

ADVANTAGES

In the printable member of the invention, the coating which is cured into a printable surface layer contains (a) a compound having a quaternary ammonium salt group having three alkyl groups and (b) a compound having a carboxyl group. At least one of these compounds is a monomer having an ethylenically unsaturated reactive group at a terminal end. The compound having a quaternary ammonium salt group has at least 4, preferably at least 5 carbon atoms in total as contained in the three alkyl groups of the quaternary ammonium salt group and preferably contains an alkyl group of 3 to 10 carbon atoms. A coating containing these compounds is cured with radiation, typically UV to form a printable surface layer.

The use of the compound having a quaternary ammonium salt group is effective for improving water resistance and allows for easy preparation of a coating solution. The use of the compound having a carboxyl group is effective for imparting quick drying property. The coating or surface layer of the printable member using these compounds allows for quick drying of ink. The surface layer is fully resistant to water in the sense that the printed mark is not oozed when wetted with water and the layer itself is not stripped when wiped after exposure to running water. The printed mark remains stable. The surface layer has a high surface hardness and is durable as compared with the prior art. The surface layer is free of dot oozing and offers high resolution and color printability. Firm adhesion is ensured even when the printable surface layer is formed on a hydrophobic surface, for example, on a protective film of an optical recording medium.

These advantages are not attained with coatings containing either one of compounds (a) and (b). Coatings containing only (a) compound having a quaternary ammonium salt group are slow drying and coating containing only (b) compound having a carboxyl group are less resistant to water. If the total number of carbon atoms contained in the three alkyl groups of the quaternary ammonium salt group is less than 4, effective mixing of the two compounds to prepare a coating solution is prohibited and the mixture becomes white turbid.

JP-A 188387/1989 discloses to use a substantially water-insoluble copolymer containing at least 1% by weight of a monomer unit having a quaternary ammonium salt in an ink receptive layer (corresponding to the printable surface layer in the present invention). As opposed to the present invention, the total number of carbon atoms contained in the three alkyl groups of the quaternary ammonium salt group is 3. JP-A 188387/1989 describes nowhere the combined use of a compound having a carboxyl group and radiation curing of a coating. It is described nowhere that a compound having a quaternary ammonium salt group is contained as a monomer in the coating.

BRIEF DESCRIPTION OF THE DRAWINGS

These and further features of the present invention will be apparent with reference to the following description and drawings, wherein.

The only figure.

BEST MODE FOR CARRYING OUT THE INVENTION

Figure 1:
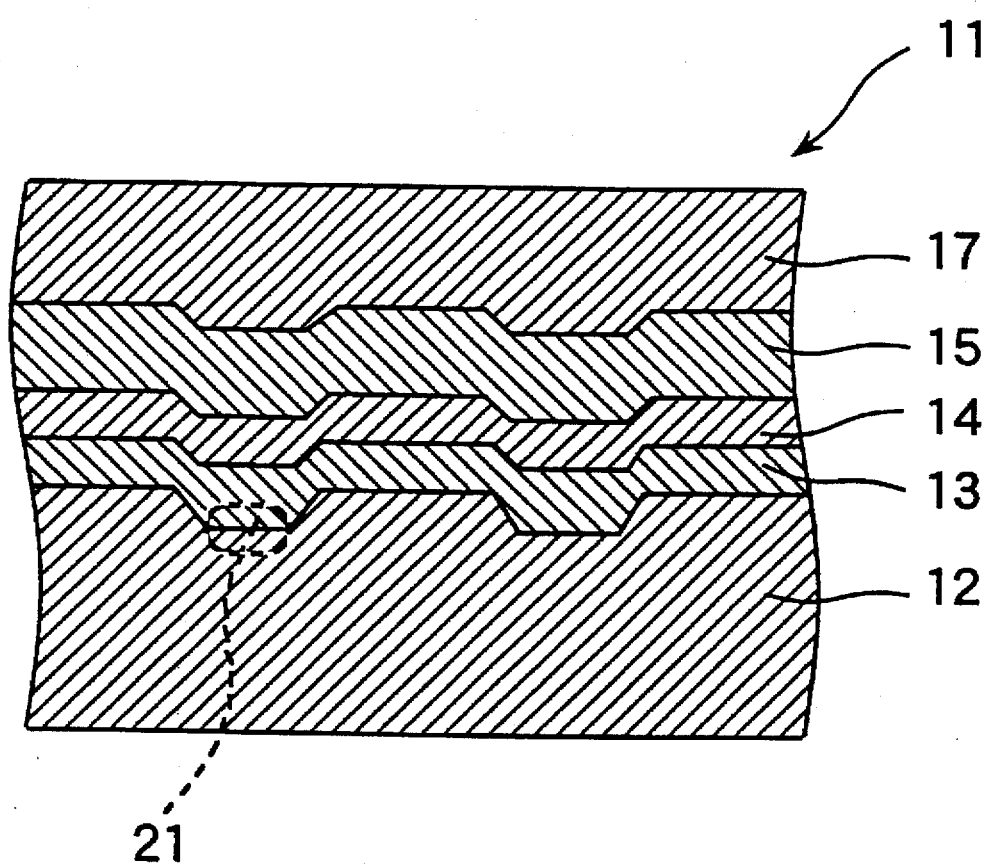
FIG. 1 is a schematic cross-sectional view of a portion of an optical recording medium according to the present invention.

The printable member of the invention includes a substrate or support and a surface layer thereon which is printable with an ink containing a water soluble dye. The printable surface layer is formed from a coating containing (a) a compound having a quaternary ammonium salt group having three alkyl groups and (b) a compound having a carboxyl group.

In (a) compound having a quaternary ammonium salt group having three alkyl groups, the total number of carbon atoms contained in the three alkyl groups of the quaternary ammonium salt group is at least 4, preferably at least 5. The upper limit of the total number of carbon atoms contained in the three alkyl groups is generally about 20, preferably about 15. Preferably the compound has an alkyl group having 3 to 10 carbon atoms.

Preferably the compound having a quaternary ammonium salt group is of the following formula (1) or (2).

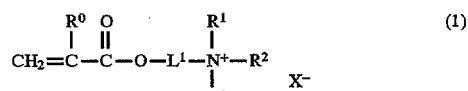

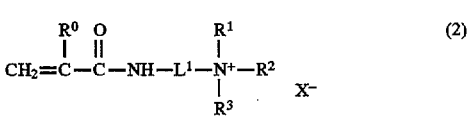

In formulae (1) and (2), $R^0$ is a hydrogen atom or methyl group. $R^1$, $R^2$, and $R^3$ each are an alkyl group. The total number of carbon atoms contained in these three alkyl groups represented by $R^1$, $R^2$, and $R^3$ is at least 4, preferably at least 5, more preferably 5 to 15, most preferably 5 to 12. At least one of $R^1$, $R^2$, and $R^3$ is an alkyl group having 3 to 10 carbon atoms.

The alkyl group represented by each of $R^1$, $R^2$, and $R^3$ may be a straight chain or branched one and have 1 to about 10 carbon atoms. Exemplary alkyl groups include methyl, ethyl, n-propyl, iso-propyl, n-butyl, iso-butyl, s-butyl, t-butyl, n-pentyl, iso-pentyl, neo-pentyl, t-pentyl, n-hexyl, neo-hexyl, iso-hexyl, n-heptyl, n-octyl, n-nonyl, and n-decyl groups. $R^1$, $R^2$, and $R^3$ are preferably chosen from these groups such that the number of carbon atoms may meet the above requirement. It is preferred that one of $R^1$, $R^2$, and $R^3$ be an alkyl group having 3 to 10 carbon atoms and the remaining two be alkyl groups having 1 to 5 carbon atoms. It is especially preferred that one of $R^1$, $R^2$, and $R^3$ be an alkyl group having 3 to 10 carbon atoms and the remaining two be methyl.

These alkyl groups are preferably unsubstituted ones although they may have a substituent. Exemplary substituents are hydroxyl, ether, and ester groups. Preferred are alkyl groups terminally substituted with a hydroxyl group, especially alkyl groups of 3 to 10 carbon atoms terminally substituted with a hydroxyl group.

In formulae (1) and (2), $L^1$ is an alkylene group having 1 to 8 carbon atoms, preferably 2 to 5 carbon atoms. The alkylene groups may be a straight chain or branched one, with the straight chain ones being preferred. The alkylene groups may have a substituent such as ether and ester groups although unsubstituted ones are preferred. The alkylene group may have at least one intervening group selected from an oxy group (—O—) and a carbonyl group (—CO—), for example, oxy (—O—) and carbonyloxy (—COO—) groups.

Examples of the alkylene group include —$(CH_2)_p$— wherein p is 1 to 8, —$C(CH_3)H$—$CH_2$—, —$[(CH_2)_2$—$O]_q$—$(CH_2)$— wherein q is 1 or 2, and —$[(CH_2)_2$—$COO]_r$—$(CH_2)$— wherein r is 1 or 2, with —$(CH_2)_2$—, —$(CH_2)_3$—, —$(CH_2)_4$, and —$(CH_2)_5$— being preferred.

$X^-$ is a halide ion such as $Br^-$, $Cl^-$, and $I^-$.

Several illustrative, non-limiting examples of (a) compound having a quaternary ammonium salt group are given below.

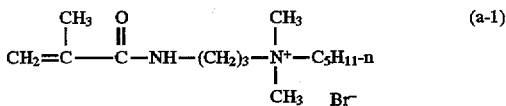

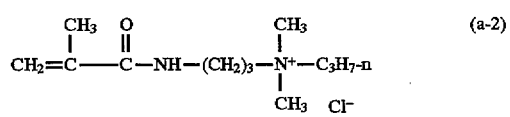

-continued

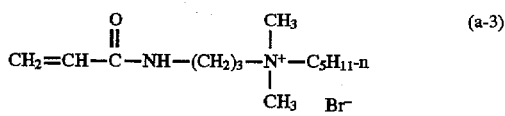

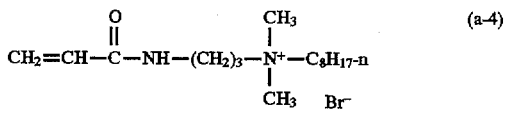

The compound having a quaternary ammonium salt group can be prepared by reacting a (meth)acrylate compound having an alkylamino group with an alkyl halide in an organic solvent such as toluene in the presence of a polymerization inhibitor such as m-dinitrobenzene. This reaction may be effected by agitating the reaction mixture at about room temperature (15° to 30° C.) to about 150° C. for about 5 to about 50 hours.

Synthesis examples are given below.

Synthesis Example 1

Synthesis of compound (a-1)

To toluene were added 18 g of dimethylaminopropyl methacrylate and 15 g of n-pentyl bromide. Additionally, m-dinitrobenzene was added to the solution in a concentration of 4% by weight. The solution was agitated at room temperature for 30 hours, obtaining a white precipitate. It was collected by filtration, washed with toluene, and further worked up, yielding the end product.

Synthesis Example 2

Synthesis of compound (a-2)

To toluene were added 18 g of dimethylaminopropyl methacrylate and 9.5 g of n-propyl chloride. Additionally, m-dinitrobenzene was added to the solution in a concentration of 4% by weight. The solution was agitated at 100° C. for 30 hours, obtaining a white precipitate. It was collected by filtration, washed with toluene, and further worked up, yielding the end product.

The remaining compounds could be synthesized by a similar procedure.

These compounds (a) can be identified by elemental analysis, proton nuclear magnetic resonance spectroscopy ($^1$HNMR), and infrared absorption spectroscopy (IR).

The compounds having a quaternary ammonium salt group may be used alone or in admixture of two or more. With respect to the content of compound (a) in the printable surface layer, the coating should preferably contain about 1 to 50% by weight, more preferably about 3 to 30% by weight of compound (a). Within this content range, the coating is fully improved in water resistance. If the content of compound (a) is below the range, some of the benefits of the invention would be lost. If the content of compound (a) is above the range, its compatibility with other components would be worsened, inviting crystallization. Additionally, a coating with a too higher content of compound (a) would be less resistant to water and less strong even after radiation curing.

It is noted that the presence of a quaternary ammonium salt group is advantageous from print stability and other aspects when an ink containing a water soluble dye having an anion such as sulfonate anion is used for printing.

Component (b) in the coating is a compound having a carboxylic acid group. The compound is not critical as long as it has at least one carboxyl group. The compound is preferably at least one member selected from the group consisting of acrylic acid, methacrylic acid and derivatives thereof. Compounds of the following formula (3) are preferred, inter alia.

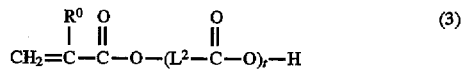

In formula (3), $R^0$ is a hydrogen atom or methyl group, $L^2$ is an alkylene group, and letter t is 0 or 1 to 5. The alkylene group may be a straight chain or branched one and preferably has 1 to 8 carbon atoms. Exemplary alkylene groups are $-(CH_2)_s-$ wherein s is 1 to 8 and $-C(CH_3)H-CH_2-$, with $-(CH_2)_2-$ and $-(CH_2)_5-$ being preferred. The alkylene groups may have a substituent such as carboxyl and hydroxyl groups although unsubstituted ones are preferred. Letter t is 0 or 1 to 5, preferably 0 or 1 to 3.

Several illustrative, non-limiting examples of (b) compound having a carboxyl group are given below.

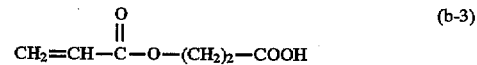

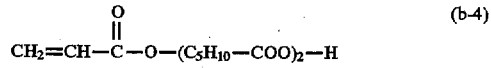

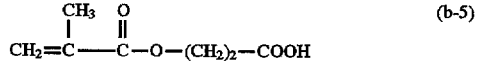

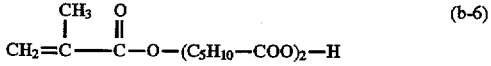

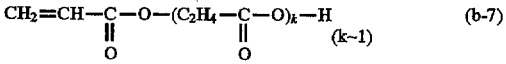

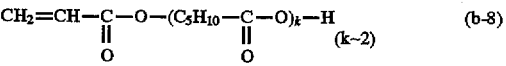

Among the exemplified compounds, compounds (b-7) and (b-8) are commercially available as Aronix M-5600 and M5300 from Toa Synthetic Chemical K.K., respectively.

Other exemplary derivatives of (meth)acrylic acid are given below.

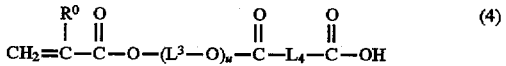

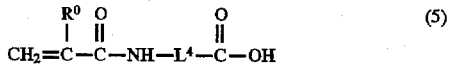

In formulae (4) and (5), $R^0$ is a hydrogen atom or methyl group; $L^3$ is an alkylene group of 2 to 6 carbon atoms which may be substituted with a carboxyl group; $L^4$ is alkylene group of 2 to 6 carbon atoms which may be substituted with a carboxyl group, arylene group (e.g., phenylene) or heterocyclic group; and letter u is 1 to 5, especially equal to 1 or 2.

One useful example of the compound of formula (4) is given below.

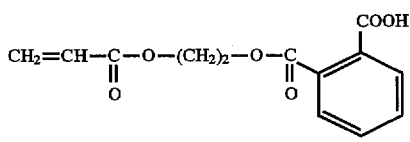

It is noted that the compound of formula (4) wherein $R^0$ is H, $L^3$ and $L^4$ each are ethylene, and u is 1 and the compound of formula (4) wherein $R^0$ is H, $L^3$ is ethylene, $L^4$ is o-phenylene, and u is 1 are commercially available as Aronix M-5800 and M5400 from Toa Synthetic Chemical K.K., respectively.

Also useful are compounds of the following formulae.

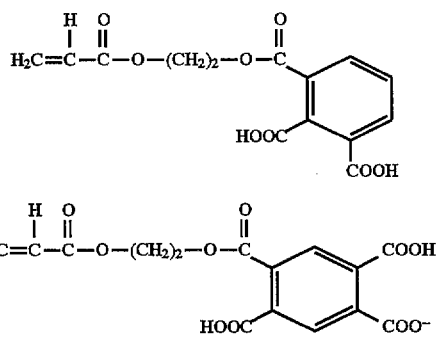

Other examples of the compound having a carboxyl group include allylacetic acid, allyloxypropionic acid, itaconic acid, maleic acid, allylmalonic acid, and derivatives thereof such as monoethyl itaconate, monomethyl itaconate, maleic acid monoamide, monomethyl maleate, and monoethyl maleate.

The compound having a carboxyl group should preferably be used as a monomer although it may be used in the form of an oligomer.

The compounds having a carboxyl group may be used alone or in admixture of two or more. With respect to the content of compound (b) in the printable surface layer, the coating should preferably contain about 5 to 70% by weight, more preferably about 15 to 60% by weight of compound (b). Within this content range, the coating is fully improved in drying. If the content of compound (b) is below the range, some of the benefits of the invention would be lost. If the content of compound (b) is above the range, there would accompany declines of print quality such as ink repellency and dot oozing.

The compound having a quaternary ammonium salt group (a) and the compound having a carboxyl group (b) are present in the coating preferably in a weight ratio of from 3/1 to 1/20, more preferably from 2/1 to 1/10. Better results are obtained by controlling the weight ratio of compound (a) to compound (b) to fall in this range.

In the present invention, at least one of the compound having a quaternary ammonium salt group (a) and the compound having a carboxyl group (b) should be a monomer having an ethylenically unsaturated reactive group at a terminal end. Preferably each of compounds (a) and (b) is a monomer having an ethylenically unsaturated reactive group at a terminal end. Where a plurality of compounds (a) or (b) are used, it is preferred that at least one of them be a monomer having an ethylenically unsaturated reactive group at a terminal end, and most preferably all of them are such monomers.

A coating containing both compounds (a) and (b) is radiation curable and after curing, improved in water resistance. Print quality is improved since printed dots are not oozed.

In one preferred embodiment of the invention, the printable surface layer or coating contains (c) a compound having a hydroxyl group in addition to compounds (a) and (b) because the coating is thereby improved in quality, for example, becomes tack-free. Examples of the compound having a hydroxyl group include (meth)acrylate compounds, typically polyethylene glycol mono(meth)acrylates represented by

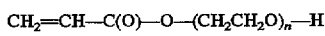

and

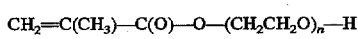

wherein n is 1 to 4, pentaerythritol bis(meth)acrylates, and pentaerythritol tri(meth)acrylates.

Where the compound having a hydroxyl group (c) is used, the coating preferably contains up to 30% by weight, more preferably 1 to 25% by weight of compound (c). Better results are obtained within this content range. As the content of compound (c) decreases, its effect approaches nil. If the content of compound (c) is above the range, water resistance drop and curing defects would occur.

In the practice of the invention, (d) a compound having a morpholino group may be used in the printable surface layer or coating along with or instead of the hydroxyl-bearing compound (c). Like compound (c), compound (d) is effective for improving film quality. Preferred examples of the compound having a morpholino group are (meth)acrylate compounds having a morpholino group such as acryloylmorpholine and methacryloylmorpholine.

Where the compound having a morpholino group (d) is used, the coating preferably contains up to 40% by weight, more preferably 5 to 35% by weight of compound (d). Better results are obtained within this content range. As the content of compound (d) decreases, its effect approaches nil. If the content of compound (d) is above the range, curing defects and print quality decline would occur.

Since the printable surface layer is formed by curing the coating with radiation, for example, an electron beam and ultraviolet (UV) radiation, especially by UV curing, (e) a polymerization initiator, especially a photo-polymerization initiator is preferably contained in the coating.

The photo-polymerization initiator used herein is not critical. Useful initiators include benzoates, benzophenone derivatives, benzoin derivatives, thioxanthone derivatives, acetophenone derivatives, propiophenone derivatives, and benzyl. More specifically, there are included methyl-orthobenzoyl benzoate, benzophenone, 4,4-bisdiethylaminobenzophenone, dibenzosuberone, benzoyl alkyl ethers (having an alkyl group of 1 to 8 carbon atoms which may be branched), 1-phenyl-1,2-propanedione-2-(o-ethoxycarbonyl)oxime, 1-phenyl-1,2-propanedione-2-(o-benzoyl)oxime, 2,2-dimethoxy-2-phenylacetophenone, 2,2-diethoxyacetophenone, chlorinated acetophenone derivatives, 4-isopropyl-2-hydroxy-2-methyl-propiophenone, 2-hydroxy-2-methylpropiophenone, 2-hydroxy-2-methyl-1-phenylpropan-1-one, and benzyl. Preferred among these are 2-hydroxy-2-methyl-1-phenylpropan-1-one, 2,2-dimethoxy-2-phenylacetophenone, and methyl-orthobenzoyl benzoate. Among these preferred initiators, 2-hydroxy-2-methyl-1-phenylpropan-1-one is commercially available as Darocure 1173 from Merck & Co., Inc. and 2,2-dimethoxy-2-phenylacetophenone is commercially available as Irgacure 652 from Ciba-Geigy Corp.

In the coating, the polymerization initiator is preferably contained in an amount of up to 10% by weight, more preferably 0.1 to 10% by weight, most preferably 0.3 to 10% by weight. Lesser amounts of the initiator would be ineffective whereas more than 10% of the initiator would cause coloring, weather yellowing, and corrosion.

In addition to (a) compound having a quaternary ammonium salt group, (b) compound having a carboxyl group, and optional compounds as mentioned above, the coating may further contain (f) a monomer or oligomer having an ethylenically unsaturated reactive group or both, if necessary. The compound having an ethylenically unsaturated reactive group may be selected from acrylate, acrylamide and vinyl compounds, for example. More specifically, there are included acrylamides such as N,N-methylenebisacrylamide; acrylates such as ethylene glycol bis(meth)acrylate, diethylene glycol bis(meth)acrylate, triethylene glycol bis(meth)acrylate, hexaethylene glycol bis(meth)acrylate, propylene glycol bis(meth)acrylate, 1,4-butanediol bisacrylate, 1,6-hexanediol bisacrylate, and trimethylolpropane triacrylate; and vinyl compounds such as 3,9-divinylspirobi(m-dioxane) and divinyl adipate. Preferred among these are N,N-methylenebisacrylamide, triethylene glycol bis(meth)acrylate, and hexaethylene glycol bis(meth)acrylate.

The amount of compound (f) added depends on the number of ethylenically unsaturated reactive groups at the end of its molecule and the other components. Preferably compound (f) is added in an amount of up to 50% by weight, more preferably up to 40% by weight, most preferably up to 25% by weight of the weight of the printable surface layer or coating. Within this range, compound (f) is effective for improving the water resistance of a coating to the extent that the physical properties of the coating are not altered even when exposed to running water, and hence, the water resistance of a printed mark. It is also effective for improving the hardness of a coating while maintaining ink adsorptivity. If the amount of compound (f) exceeds the limit, the printable surface layer or coating would be too hard and brittle and have drawbacks including a low ink absorption rate, slow ink drying, and susceptibility to swelling and cracking by ink.

The printable surface layer or coating may further contain (g) a resin. Any desired resin may be used as long as it is well compatible with the other components. Exemplary resins include acrylic resins, methacrylic resins, polyamides such as nylon, melamine resins, cellulose resins, polyvinyl alcohol, and polyesters. The resin may also be incorporated by adding a radiation curable monomer or oligomer in a coating and curing the coating to eventually convert the monomer or oligomer into a resin. The amount of the resin contained is preferably up to 50% by weight, more preferably up to 30% by weight of the printable surface layer or coating. The resin within this content range is effective for improving the strength and water resistance of a coating and mitigating the warpage of the underlying substrate. A coating with a larger content of the resin would be repellent to ink and adversely affect quick drying of ink.

Preferably, (h) porous particles are contained in the printable surface layer or coating for the purpose of improving its function as an ink receptive layer by allowing only the solvent to penetrate over a wide area without allowing the dye to diffuse, thereby promoting drying. Any of porous particles commonly used for such purposes may be used herein. Exemplary porous particles are inorganic pigments including silica, clay, talc, diatomaceous earth, calcium carbonate, calcium sulfate, barium sulfate, aluminum silicate, synthetic zeolite, alumina, zinc oxide, titanium oxide, lithopone, and titanium white. Smectite is also useful.

The porous particles preferably have a mean particle size of 0.001 to 50 µm, more preferably 0.001 to 30 µm. Outside the range, larger particles would render the coating brittle and the surface irregular whereas smaller particles would retard solvent penetration.

Preferred among the porous particles used herein are silica, alumina, and titanium oxide. The preferred silica is ultrafine particulate anhydrous silica, primary particles of which preferably have a mean particle size of 0.001 to 30 µm. Commercially available examples of silica are those of the trade names: Aerosil TT600, OX50, OX380, OX200, OX130, OX300, MOX80, MOX170, and COK84 from Aerosil K.K. and SiLCRONG-100, G-100T, G-600, G-601, G-602, and G-603 from SCM Chemicals K.K. Commercially available examples of alumina and titanium oxide are Aluminium Oxide C and Titanium Oxide P25 from Aerosil K.K., respectively.

The content of porous particles added may be determined in accordance with a particular application and purpose. Higher loadings of porous particles are effective for ink diffusion, but render the printable surface layer or coating brittle and less durable. For this reason, the content of porous particles should preferably be up to 70% by weight, more preferably up to 50% by weight based on the weight of the printable surface layer or coating. Where two types of porous particles are used, the total content of porous particles should preferably be up to 70% by weight. The lower limit of the porous particle content is usually about 10% by weight though not critical.

To the printable surface layer or coating, there may be further added photo-polymerization promoters such as triethanol amine and 2-(dimethylamino)ethylbenzoate, chain transfer agents, radical polymerization inhibitors such as phenothiazine, chelating agents such as N-nitrosophenylhydroxylamine ammonium salt, and stabilizers.

In the practice of the invention, the printable surface layer is formed on the substrate by first preparing a coating solution containing (a) a compound having a quaternary ammonium salt group, (b) a compound having a carboxyl group, and other components for forming the layer and applying the coating solution to the substrate to form a coating thereon.

A solvent may be used in preparing the coating solution. The solvent need not necessarily be used if a liquid component is included in the layer-forming components. When the compound having a quaternary ammonium salt group and the compound having a carboxyl group are monomers having an ethylenically unsaturated reactive group, which are liquid, the solvent need not be used. When used, the solvent may be selected from methanol, ethanol, butyl carbitol and ethyl cellosolve, for example. A mixture of two or more of these solvents is also useful. The type and amount of the solvent used in the coating solution and the ratio of solvents are not critical and may be suitably determined in accordance with the composition, preparing and applying techniques of the coating solution.

The applying technique may be any of conventional techniques including spin coating, spray coating, dipping, gravure coating, knife coating, reverse roll, screen printing, and bar coater techniques. Where a coating solution which is adjusted to an adequate viscosity by adding lipophilic smectite is used, it may be effectively coated by screen printing, gravure roll, and bar coater techniques.

The coating is then cured by exposing it to radiation. Where a solvent is used in the coating solution, the coating should be dried before it is cured by exposure to radiation. The radiation used herein is preferably UV radiation as previously mentioned. UV radiation may be irradiated at an intensity of at least about 50 mW/cm$^2$ and a dose of about 200 to about 2,000 mJ/cm$^2$. A source of UV radiation may be a conventional one, typically a mercury lamp.

In this way, the coating is cured into a printable surface layer which is preferably about 1 to 100 µm thick, more preferably about 3 to 30 µm thick. Too thick layers would cause warpage of the underlying substrate and short-curing whereas too thin layers would prevent solvent penetration and drying of ink after printing.

Preferably the printable surface layer has a contact angle with water at 25° C. of up to 60°, more preferably up to 40°. With the contact angle adjusted in this range, the printable surface layer has good adhesion to even a hydrophobic substrate and is effectively printable with ink containing a water soluble dye. A higher contact angle would hinder printing with ink containing a water soluble dye.

The substrate or support which bears the printable surface layer thereon according to the invention includes substrates commonly used in the ink jet printing method, for example, paper, slide film, overhead projector (OHP) film, and color mosaic filter (CMF). The advantage of the invention is fully taken out when the invention is applied to substrates having a hydrophobic surface, typically optical recording media having a radiation cured protective film, especially recordable compact discs having a UV cured protective film. When the invention is applied to a recordable compact disc having a hydrophobic surface, the printable surface layer is formed on the surface of the compact disc on which a label is to be printed. The printable surface layer forms a firm bond to the hydrophobic surface. Then the user can print the contents of optical record information on the printable surface layer using an ink containing a water soluble dye, typically ink jet printing ink.

The UV cured protective film on the optical recording medium may be any of protective films commonly used in this type of recordable compact disc. For example, the UV cured protective film is formed from UV curable compounds such as polyfunctional oligo-ester acrylates to a thickness of about 0.5 to 100 µm. It is noted that the invention is effectively applicable to hydrophobic substrates having a contact angle with water at 25° C. of at least 40°, especially 60° to 90°.

Referring to FIG. 1, an optical recording medium is illustrated as one exemplary structure of the member having a printable surface layer according to the present invention.

The optical recording medium 11 of FIG. 1 includes a substrate 12, a recording layer 13 composed mainly of a dye on the substrate 12, a reflective layer 14 in close contact with the recording layer 13, and a protective film 15 on the reflective layer 14. The medium 11 further includes a printable surface layer 17 on the protective film.

The substrate 12 is formed of a resin or glass material which is substantially transparent (preferably a transmittance of at least 88%) to recording and reading light, typically a semiconductor laser beam having a wavelength of about 600 to 900 nm, especially about 770 to 900 nm, most often 780 nm. Then recording and reading operation can be made from the rear surface (or lower surface in the figure) of the substrate.

Preferably, resins are used as the substrate material, with preferred examples including thermoplastic resins such as polycarbonate resins, acrylic resins, amorphous polyolefins, and TPX. The substrate 12 may be prepared by conventional techniques such as injection molding. At this point, a predetermined pattern, typically a groove 21 is preferably formed in the substrate surface for tracking and addressing purposes. It is noted that after the substrate 12 is prepared, a resin layer having a predetermined pattern including grooves may be formed thereon by 2P (photopolymerization) method or the like.

The recording layer 13 may contain only one dye or a mixture of compatible dyes. No particular limit is imposed on the light absorbing dye used in the recording layer 13 as long as it has maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more.

A quencher may be mixed with the light absorbing dye. Alternatively, an ionic combination or ionically bonded compound of a dye cation and a quencher anion is a useful light absorbing dye. Preferred quenchers used herein are metal complexes of acetylacetonates, bisdithiols such as bis(dithio-α-diketones) and bisphenyldithiols, thiocatechols, salicylaldehydeoximes, and thiobisphenolates. Also useful are amine quenchers such as amine compounds having a nitrogenous radical cation and hindered amines. For the ionically bonded dye combination, cyanine dyes having indolenine rings and metal complex quenchers such as bisphenyldithiol metal complexes are preferred.

The recording layer 13 is formed by spin coating, more particularly by dissolving the dye in a suitable organic solvent to form a coating solution and applying and spreading the coating solution on a rotating substrate. The organic solvent used in preparing a coating solution for the recording layer may be selected in accordance with a particular dye used from alcohols, ketones, esters, ethers, aromatics, and alkyl halides, with organic solvents having two or more functional groups in a molecule being preferred. The coating is dried after spin coating, if desired.

Preferably, the recording layer 13 thus formed has a thickness of about 1,000 to about 3,000 Å although the exact thickness depends on the reflectivity or the like.

On the recording layer 13, the reflective layer 14 is formed in direct close contact. The reflective layer 14 is formed of a high reflectivity material. Such preferred materials are Au, Cu, Ag, Al and alloys thereof. The reflective layer 14 may be formed by various vapor phase deposition techniques such as sputtering and evaporation. The reflective layer 14 preferably has a thickness of at least 500 Å. No upper limit is imposed on the thickness although it should preferably be up to about 1,700 Å from the standpoints of cost and operational time.

On the reflective layer 14 is formed the protective film 15. The protective film 15 may be formed from various resins such as UV curable resins, preferably to a thickness of about 0.5 to 100 µm, more preferably about 1 to 50 µm, most preferably about 3 to 30 µm. If a film is too thin below the range, it would provide insufficient protection so that frequent errors might occur in record signals. If a film is too thick, the recording medium would be warped or the protective film would be cracked due to shrinkage during curing of a resin film. The protective film 15 may be a coating or a distinct sheet. In the case of a coating, it may be applied by spin coating, gravure coating, spray coating, and dipping. It is noted that the protective film 15 is a single layer in the illustrated embodiment although it may have a multilayer structure having two or more layers. In the case of a multilayer structure, the total thickness of layers should preferably fall in the above-defined range.

In the practice of the invention, a white pigment is preferably contained in at least one of the protective film 15 and the printable surface layer 17 on the reflective layer 14. In the case of a multilayer structure protective film, the white pigment may be contained in one or more of the protective layers. Examples of the white pigment include calcium sulfate, barium sulfate, zinc oxide, titanium oxide, lithopone, and titanium white. The white pigment is effective for improving color development in the case of color printing. The white pigment used herein preferably has a mean particle size of up to 30 μm, more preferably 0.001 to 20 μm though not limited thereto. A larger particle size would render a film brittle. The content of white pigment is preferably about 0.1 to 20% by weight based on the total weight of the layer to which it is added. Less amounts are ineffective whereas larger amounts of white pigment would render a film brittle. In one preferred embodiment wherein the protective film consists of two or more layers, the white pigment is added to one layer.

The optical recording medium having a printable surface layer 17 formed in the above-mentioned way is preferably printed by means of a writing tool of the ink jet printing system while printing is possible with a pen filled with ink containing a water soluble dye, but at the risk of increased errors.

The ink used herein is not critical as long as it contains a water soluble dye. Any of inks suitable for use in a writing tool of the ink jet printing system may be used. Examples of the water soluble dye include direct dyes such as C.I. Direct Black 17, 19, 32, 51, 71, 108, and 146, C.I. Direct Blue 6, 22, 25, 71, 86, 90, 106, and 199, C.I. Direct Red 1, 4, 17, 28, and 83, C.I. Direct Yellow 12, 24, 26, 86, 98, and 142, C.I. Direct Orange 34, 39, 44, 46, and 60, C.I. Direct Violet 47 and 48, C.I. Direct Brown 109, and C.I. Direct Green 59; and acid dyes such as C.I. Acid Black 2, 7, 24, 26, 31, 52, 63, 112, and 118, C.I. Acid Blue 9, 22, 40, 59, 93, 102, 104, 113, 117, 120, 167, 229, and 234, C.I. Acid Red 1, 6, 32, 37, 51, 52, 80, 85, 87, 92, 94, 115, 180, 256, 315, and 317, C.I. Acid Yellow 11, 17, 23, 25, 29, 42, 61, and 71, C.I. Acid Orange 7 and 19, C.I. Acid Violet 49. Also useful are C.I. Basic Black 2, C.I. Basic Blue 1, 3, 5, 7, 9, 24, 25, 26, 28, 29, C.I. Basic Red 1, 2, 9, 12, 13, 14, and 37, C.I. Basic Violet 7, 14, and 27, C.I. Food Black 1 and 2, and Water Black 187L. Dyes having an anionic group such as a sulfonate group or a salt thereof, phenolic hydroxyl group, and carboxyl group are also useful. It is noted that some of the above-mentioned dyes fall in this class.

EXAMPLE

Examples of the present invention are given below by way of illustration and not byway of limitation. All parts are by weight.

Example 1

A coating solution No. 1 for forming a printable surface layer was prepared by agitating the following components in a mixer for one hour.

| Coating solution | Parts by weight |
| --- | --- |
| Compound (a-1) | 10 |
| Compound (b-7) *Aronix M-5600, Toa Synthetic Chemical K.K.) | 40 |
| Ethylene glycol monomethacrylate | 20 |
| Photo-polymerization initiator (2-hydroxy-2-methyl-1-phenylpropan-1-one, Darocure 1173, Merck & Co., Inc.) | 5 |
| Crosslinking agent (Blemmer GMR, Nihon Usi K.K.) | 5 |
| Porous particles (mean particle size 0.04 μm, Aerosil TT-600, Aerosil K.K.) | 20 |

As the substrate, there was furnished a write-once compact disc (CD-R) of the structure shown in FIG. 1 having a protective film at the top. Coating solution No. 1 was applied onto the protective film of the disc by a screen printing technique. The coating was dried and exposed to UV radiation in a dose of 800 mJ/cm$^2$. In this way, the coating was cured into a printable surface layer of 8 μm thick. Note that the protective film of the CD-R was a film of 6 μm thick which was obtained by coating a composition comprising 97 parts of a polyfunctional oligo-ester acrylate (Aronix M-8100, Toa Synthetic Chemical K.K.) and 3 parts of 2-hydroxy-2-methyl-1-phenylpropan-1-one (Darocure 1173, Merck & Co., Inc.) and curing the coating with UV radiation. The reflective layer was of gold.

The thus obtained optical recording medium is designated sample No. 1.

Sample No. 2 was prepared as in sample No. 1 except that a coating solution No. 2 containing compound (a-2) instead of compound (a-1) in coating solution No. 1 was used to form a printable surface layer.

Sample No. 3 was prepared as in sample No. 1 except that a coating solution No. 3 was used to form a printable surface layer. Coating solution No. 3 had the same composition as coating solution No. 1 except that 20 parts of compound (a-3) was used instead of compound (a-1), the amount of compound (b-7) was changed to 35 parts, and 15 parts of ethylene glycol monoacrylate was used instead of 20 parts of ethylene glycol monomethacrylate.

Sample No. 4 was prepared as in sample No. 1 except that a coating solution No. 4 was used to form a printable surface layer. Coating solution No. 4 had the same composition as coating solution No. 1 except that 15 parts of compound (a-4) was used instead of compound (a-1), the amount of compound (b-7) was changed to 35 parts, and acryloylmorpholine was used instead of ethylene glycol monomethacrylate.

An attempt was made to prepare a coating solution No. 5 according to coating solution No. 1, using a comparative compound of the following formula instead of compound (a-1).

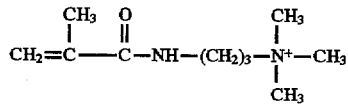

Effective mixing was impossible and the mixture became white turbid. Using this coating solution No. 5, a printable surface layer was similarly formed in a CD-R. This is designated sample No. 5.

Sample No. 6 was prepared as in sample No. 1 except that a coating solution No. 6 was used to form a printable surface layer. Coating solution No. 6 had the same composition as coating solution No. 1 except that compound (a-1) was omitted, the amount of compound (b-7) was changed to 50 parts, and the amount of ethylene glycol monomethacrylate was changed to 20 parts.

Sample No. 7 was prepared as in sample No. 1 except that a coating solution No. 7 was used to form a printable surface layer. Coating solution No. 7 had the same composition as coating solution No. 1 except that compound (b-7) was omitted, the amount of compound (a-1) was changed to 20 parts, and the amount of ethylene glycol monomethacrylate was changed to 50 parts.

On the surface layer of sample Nos. 1 to 7, characters were printed by an ink jet printing machine loaded with inks of the following composition.

| Ink composition | Parts by weight |
| --- | --- |
| Yellow ink | |
| C.I. Direct Yellow 86 | 2 |
| Diethylene glycol | 20 |
| Polyethylene glycol | 10 |
| Water | 70 |
| Red Ink | |
| C.I. Acid Red 35 | 2 |
| Diethylene glycol | 20 |
| Polyethylene glycol | 10 |
| Water | 70 |
| Blue Ink | |
| C.I. Direct Blue 86 | 2 |
| Diethylene glycol | 20 |
| Polyethylene glycol | 10 |
| Water | 70 |
| Black ink | |
| C.I. Food Black 2 | 2 |
| Diethylene glycol | 20 |
| Polyethylene glycol | 10 |
| Water | 70 |

The printed samples were examined by the following tests. The results are shown in Table 1.

(1) Drying time of printed characters (quick drying)

The drying time is a time taken from printing until the printed mark becomes tack-free to fingers touching the printed surface. It was rated "QQ" when the drying time was up to 30 seconds, "Q" when the drying time was from more than 30 seconds to 1 minute, "Slow" when the drying time was more than 1 minute, and "Wet" when ink remained wet over 24 hours.

(2) Water resistance

After characters were printed and dried, the printed surface layer was placed in running water for one minute.

(2-1) Ink adsorption

The printed characters were visually inspected for density before and after the 1-minute exposure to running water. Ratings were "Good" when the density of the printed characters was substantially unchanged, "Fair" when the printed characters became slightly vague, but were readable, and "Poor" when the printed characters almost disappeared and were unreadable.

(2-2) Film quality

After the 1-minute exposure to running water, the sample was rated "Good" when the layer surface remained substantially unchanged, "Fair" when the layer surface was somewhat softened, and "Poor" when the surface layer was stripped or flowed away along with the running water.

(2-3) Wiping resistance

After the 1-minute exposure to running water, the layer surface was wiped with fabric (e.g., towel) and paper (e.g., paper towel and tissue paper). The sample was rated "Good" when the layer surface remained substantially unchanged, "Fair" when the surface layer was partially stripped by vigorous wiping, and "Poor" when the surface layer was readily stripped.

(3) Resolution

Dots of the printed character were observed under an optical microscope to see whether or not they were oozed. Ratings were "Good" for no oozing, "Fair" for slight oozing, and "Oozed" for apparent oozing.

TABLE 1

| Sample No. | Coating solution | | Quick drying | Water resistance | | | Resolution |
| | Compound (a) | Compound (b) | | Ink adsorption | Film quality | Wiping resistance | |
| --- | --- | --- | --- | --- | --- | --- | --- |
| 1 | a-1 | b-7 | QQ or Q | Good | Good | Good | Good |
| 2 | a-2 | b-7 | QQ or Q | Good | Good | Good | Good |
| 3 | a-3 | b-7 | QQ or Q | Good | Good | Good | Good |
| 4 | a-4 | b-7 | QQ or Q | Good | Good | Good | Good |
| 5* | comparative | b-7 | coating solution was white turbid due to ineffective mixing | | | | |
| 6* | — | b-7 | Q | Poor | Poor | Poor | Oozed |
| 7* | a-1 | — | Wet | Fair | Fair | Fair | Oozed |
| 8 | a-1 | b-3 | QQ or Q | Good | Good | Good | Good |
| 9 | a-1 | b-6 | QQ or Q | Good | Good | Good | Good |
| 10 | a-2 | b-8 | QQ or Q | Good | Good | Good | Good |
| 11 | a-3 | b-4 | QQ or Q | Good | Good | Good | Good |

*comparison

The advantages of the invention are evident from Table 1. In sample Nos. 1 to 4 within the scope of the invention, the adhesion between the protective film and the printable surface layer was firm enough. Specifically, the adhesion was examined by attaching Scotch Clear Tape 600 of 3M Co. to the printable surface layer over an area of 1.2×1.0 cm, pulling the adhesive tape off, and examining whether or not the printable surface layer was stripped. The samples within the scope of the invention underwent no stripping.

Example 2

A disc sample was prepared as in sample No. 1 of Example 1 except that a coating solution containing 5 parts of compound (a-2) and 5 parts of compound (a-4) instead of compound (a-1) in coating solution No. 1 was used to form a printable surface layer. This sample was examined as in Example 1, obtaining equivalent results to sample No. 1.

Example 3

Disc samples were prepared as in sample Nos. 1 to 4 of Example 1 except that compounds (b-1) to (b-6) and (b-8) were individually used instead of compound (b-7) in coating solution Nos. 1 to 4. These samples were examined as in Example 1, obtaining equivalent results to sample Nos. 1 to 4. Equivalent results were also obtained when a coating solution containing both 20 parts of compound (b-7) and 20 parts of compound (b-4) was used. The results are partially shown in Table 1 (Nos. 8–11).

Example 4

A disc sample was prepared as in sample No. 3 of Example 1 except that a coating solution containing 10 parts of acryloylmorpholine and 5 parts of ethylene Glycol monoacrylate instead of 15 parts of ethylene glycol monoacrylate in coating solution No. 3 was used to form a printable surface layer. The sample was examined as in Example 1, obtaining equivalent results to sample No. 3.

Example 5

Disc samples were prepared as in sample No. 1 of Example 1 except that SiLCRONG-100, G-100T, G-600, G-601, G602, and G-603 from SCM Chemicals K.K. were individually used instead of Aerosil TT-600 as the porous material. The samples were examined as in Example 1, obtaining equivalent results to sample No. 1.

Example 6

Disc samples were prepared as in sample Nos. 1 to 4 of Example 1 and Examples 2 to 5 except that the protective film of the CD-R had a two layer structure. The protective film consisted of a first protective film of 6 μm thick disposed adjacent the reflective layer and a second protective film of 10 μm thick disposed thereon. They were formed in the same manner as the protective film of CD-R of Example 1. Their composition is shown below.

|  | Parts |
| --- | --- |
| First protective film | |
| Polyfunctional oligo-ester acrylate (Aronix M-8100, Toa Synthetic Chemical K.K.) | 97 |
| 2-hydroxy-2-methyl-1-phenylpropan-1-one (Darocure 1173, Merck & Co., Inc.) | 3 |

|  | Parts |
| --- | --- |
| Second protective film | |
| Polyfunctional oligo-ester acrylate (Aronix M-8100, Toa Synthetic Chemical K.K.) | 92 |
| 2-hydroxy-2-methyl-1-phenylpropan-1-one (Darocure 1173, Merck & Co., Inc.) | 3 |
| Titanium white (mean particle size 0.03 μm) | 5 |

The samples were examined as in Example 1, obtaining equivalent results to the corresponding samples. These samples were improved in color development and easy to read since the second protective film contained white pigment.

There has been described a printable member having a printable surface layer which has improved water resistance in the sense that when the printed surface layer is wiped after exposure to running water, neither the printed mark is wiped off nor the layer itself is stripped. The surface layer can be formed by a single coating step, firmly bonds with the underlying substrate, and has sufficient surface hardness. Advantageously, the printed mark remains stable. The ink drying time after printing with ink is shorter than usual. The printed mark is durable, free of dot oozing, high in resolution and adapted for color printing. Another advantage is the eliminated need for a solvent in a coating solution because the monomer can also serve as a solvent.

Japanese Patent Application No. 78096/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A printable member comprising a substrate and a surface layer thereon which is printable with an ink containing a water soluble dye, said surface layer being a radiation cured coating comprising a compound having a quaternary ammonium salt group having three alkyl groups and a compound having a carboxyl group, at least one of said compounds being a monomer having an ethylenically unsaturated reactive group at a terminal end, the total number of carbon atoms contained in the three alkyl groups of the quaternary ammonium salt group being at least 4.

2. The printable member of claim 1 wherein said compound having a quaternary ammonium salt group is a monomer of the following formula (1) or (2):

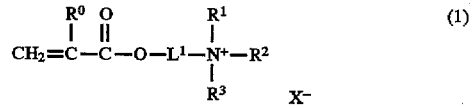

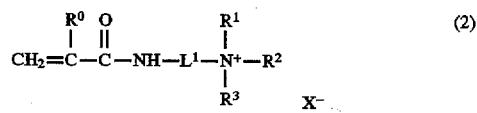

wherein $R^0$ is a hydrogen atom or methyl group, $R^1$, $R^2$, and $R^3$ each are an alkyl group, the total number of carbon atoms contained in these three alkyl groups being at least 4, $L^1$ is an alkylene group of 1 to 8 carbon atoms which may have at least one intervening group selected from an oxy group (—O—) and a carbonyl group (—CO—), and X⁻ is a halide ion.

3. The printable member of claim 1 wherein at least one of $R^1$, $R^2$ and $R^3$ is an alkyl group having 3 to 10 carbon atoms.

4. The printable member of claim 1 wherein said compound having a carboxyl group is at least one member selected from the class consisting of compounds of the following formulae (3)–(5):

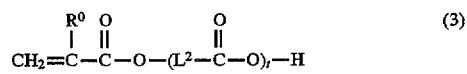   (3)

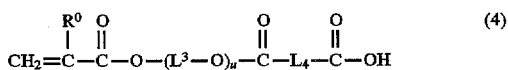   (4)

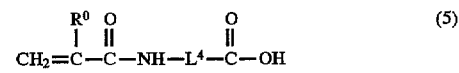   (5)

wherein $R^0$ is a hydrogen or methyl group; $L^2$ is an alkylene group which may be substituted with a carboxyl group or hydroxyl group; t is 0 to 5; $L^3$ is an alkylene group which may be substituted with a carboxyl group; $L^4$ is an alkylene group which may be substituted with a carboxyl group, an arylene group which may be substituted with one or more carboxyl groups, or a heterocyclic group; and u is 1 to 5.

5. The printable member of claim 1 wherein the radiation curing is ultraviolet radiation curing.

6. The printable member of claim 1 wherein said coating further comprises a compound having a hydroxyl group.

7. The printable member of claim 1 wherein said coating further comprises a compound having a morpholino group.

8. The printable member of claim 1 wherein said coating further comprises porous particles.

9. The printable member of claim 1 wherein said surface layer is printable by an ink jet printing method.

10. The printable member of claim 1 wherein said substrate is an optical recording medium having a radiation-cured protective film.

11. The printable member of claim 10 wherein said optical recording medium comprises a recording layer, a reflecting layer disposed closely on the recording layer, and at least one protective film layer on the reflecting layer including said radiation-cured protective film, at least one layer of said surface layer and said at least one protective film layer containing a white pigment.

12. The printable member of claim 1 wherein said substrate is an optical recording medium having a ultraviolet radiation-cured protective film.

* * * * *